United States Patent [19]

Takei

[11] 4,128,798

[45] Dec. 5, 1978

[54] CHARGING CIRCUIT

[75] Inventor: Yoshihiro Takei, Suwa, Japan

[73] Assignee: Kabushiki Kaisha Suwa Seikosha, Tokyo, Japan

[21] Appl. No.: 682,239

[22] Filed: May 3, 1976

[30] Foreign Application Priority Data

| May 2, 1975 | [JP] | Japan | 50-60087[U] |
| May 2, 1975 | [JP] | Japan | 50-60088[U] |
| Dec. 10, 1975 | [JP] | Japan | 50-146980 |

[51] Int. Cl.$^2$ .............................................. H02J 7/04
[52] U.S. Cl. ........................................ 320/23; 320/39; 320/59; 320/DIG. 2
[58] Field of Search ................ 320/23, 24, 39, 40, 320/DIG. 1, DIG. 2, 59

[56] References Cited

U.S. PATENT DOCUMENTS

| 3,111,617 | 11/1963 | Cady | 320/39 |
| 3,510,746 | 5/1970 | Furuishi et al. | 320/23 X |
| 3,688,177 | 8/1972 | Reeves | 320/24 |

Primary Examiner—Robert J. Hickey
Attorney, Agent, or Firm—Blum, Moscovitz, Friedman & Kaplan

[57] ABSTRACT

A charging circuit for charging a DC cell is provided. A supply circuit produces a charging current at a first selected value and a current gating circuit is disposed intermediate the DC cell and the supply circuit for selectively applying the charging current produced by the supply circuit to the DC cell. A control circuit is coupled to the DC cell and to the gating circuit, the control circuit being adapted to detect when the cell is charged to a predetermined maximum voltage, and in response thereto control the gating circuit to prevent the charging current from being supplied to the DC cell. The control circuit is further adapted in response to a drop in the voltage of the cell to a second predetermined level, to control the gating circuit and thereby permit a charging current of a second value reduced with respect to said first value to be applied to the DC cell.

14 Claims, 7 Drawing Figures

CHARGING CIRCUIT

BACKGROUND OF THE INVENTION

This invention is directed to a charging circuit, and in particular to a charging circuit for efficiently charging a secondary battery, such as a Ni-Cd storage battery or the like.

Although secondary batteries, such as Ni-Cd storage batteries are rechargeable, such batteries do have a distinct battery life. Among the conditions that determine the battery life is the manner in which the battery is charged. Certain methods of charging a battery can damage the battery. For example, when a battery is continually charged by a high current over a short period of time, the useful life of the battery is considerably shortened, when compared to a battery charged over a considerably longer period of time at a lower current.

Nevertheless, although it is beneficial to charge a DC cell, or battery formed of a plurality of DC cells, at a low current over a long period of time, such charging does not permit charging of the battery to a maximum capacity. Thus, when an electrical device such as an electric shaver utilizes a rechargeable DC cell as a power source, it is necessary to charge the battery to its maximum capacity between uses, in order to permit same to fully effect driving of the electric shaver.

An approach to charging a DC cell to a sufficient capacity is disclosed in Japanese patent application No. 74-110741, for a Utility Model. In the Japanese patent, a charging device that effects charging with a relatively large charging current at an early stage, and reduces or eliminates the application of charging current to the DC cell at a latter stage is provided. Specifically, the power supply applies a charging current to the battery. A control circuit controls the amount of current applied to the battery to be charged, and a battery voltage detecting circuit detects the voltage of the charged battery. In such an arrangement, the battery voltage detecting circuit detects a predetermined voltage level when the battery is fully charged, whereafter the charge current controlling circuit immediately lowers the charging current applied. Nevertheless, such an arrangement is less than completely satisfactory for several reasons.

In order to effect a complete substantially 100% charging of the secondary battery, the charge current controlling circuit is operated when a reference voltage indicative of the battery being completely charged, referred to as the charge-completion voltage, is detected to thereby reduce the amount of charge current applied to the secondary battery to be charged. When the difference between the battery voltage just prior to the charge current control circuit being operated and the battery voltage at a considerable period of time after the charge control circuit is operated is greater than the variations in the reference voltage inherent in the charge current controlling circuit, an even larger charging current is applied to the secondary battery for an additional short interval of time, even though the charge control circuit is intended to be operated to decrease the current applied to the battery. The settling or decrease in voltage of the battery is gradual over the considerable period of time thereby likely causing the above noted condition. Thus, the application of large charging current, once the battery has been charged to the charge completion voltage accelerates the deterioration of the battery. Although such a result can be avoided by selecting a charge-completion voltage at a level less than the completely charged level of the battery, the lowering of the reference level for operation of the charge control circuit will prevent substantially 100% charging of the battery.

Among the further factors that render the aforedescribed charging circuit less than completely satisfactory include the inability to control the amount of charge current applied to the secondary battery due to variations in the impedence of the charge control circuit, variations in the operating voltage $V_{BE}$ applied to the base electrode of the transistor included in charge controling circuit, and the temperature characteristics of the charge control circuit. All of these factors are likely to contribute to the overcharging of the battery, thereby accelerating the deterioration thereof.

SUMMARY OF THE INVENTION

Generally speaking, in accordance with the invention, a charging circuit for charging a DC cell is provided. The circuit includes a supply circuit for producing a charging current at a first selected value and a current gating circuit disposed intermediate the DC cell and the supply circuit for selectively applying the charging current produced by the supply circuit to the DC cell. A control circuit is coupled to the DC cell and to the gating circuit. The control circuit is particularly adapted to detect when the cell is charged to a predetermined maximum voltage, and in response thereto control the gate circuit to prevent the charging current from being supplied to the DC cell. The control circuit is further adapted in response to a drop in the voltage of the cell to a second predetermined level, to control the gating circuit and permit a charging current of a second value reduced with respect to the first value to be applied to the DC cell.

The gating circuit can be comprised of a silicon controlled rectifier or a high frequency oscillator circuit. The control circuit is formed of a flip-flop circuit for providing three distinct levels of detection, to wit, detecting the state wherein a DC cell is being charged to a maximum potential, detecting when a DC cell is charged to a maximum voltage and detecting when the voltage of the DC cell drops to the second predetermined level.

Accordingly, it is an object of this invention to provide an improved charging circuit for providing three phase charging of a secondary battery.

A further object of the instant invention is to provide an improved charging circuit for avoiding deterioration of a DC cell while effecting a substantially 100% charging of same.

Still a further object in the instant invention is to provide a control circuit capable of detecting a state of charge of a secondary battery whereat gas is envolved at the electrodes and in response thereto reduces the charging current applied thereto.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS.

For a fuller understanding of the invention, reference is had to the following description taken in connection with the accompanying drawings, in which.

DETAILED DESCRIPTION OF THE PREFERRED EMBODIMENTS

Figure 1:
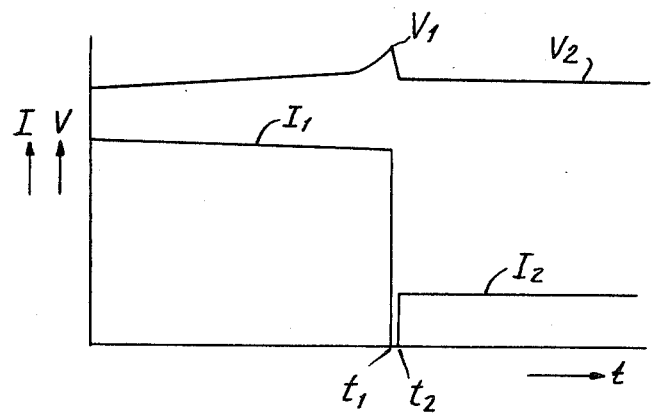
FIG. 1 is a graphical illustration of the manner in which the charging circuits constructed in accordance with the instant invention effects charging of a secondary battery.
Figure 2:
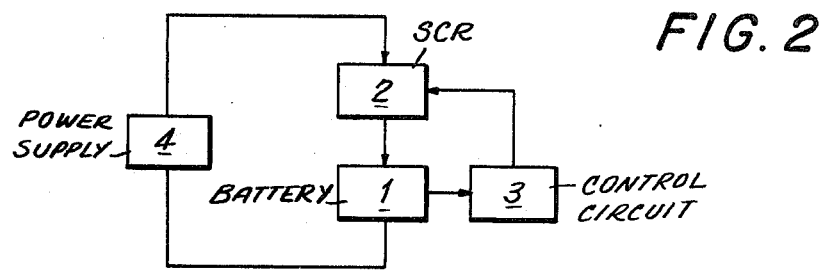
FIG. 2 is a block circuit diagram of a charging circuit constructed in accordance with a first embodiment of the instant invention.

Reference is now made to FIGS. 1 and 2, wherein a charging circuit, constructed in accordance with the instant invention, and the manner in which same operates are depicted. A battery 1 is adapted to be charged by current produced by a power supply 4. A silicon controller rectifier, hereinafter referred to as a "SCR", is disposed intermediate power supply 4 and battery 1 for gating the charging currents supplied by the power supply 4 to the battery 1. A control circuit 3 is coupled to the battery 1 to detect the distinct voltage levels of same as the battery is charged and discharged, and in response thereto controls the SCR 2 to effect gating of the charging current thereby.

Referring specifically to FIG. 1, the voltage level of the battery being charged, and the amount of charging current being applied to the battery, as a function of time, by the charging circuit depicted in FIG. 2, is illustrated. Initially, as the battery 1 is being charged, SCR 2 gates substantially all of the charging current produced by the power supply 4 to the battery 1. The battery is completely charged to voltage $V_1$, which voltage represents a substantially 100% charged condition, at which gas will begin to be envolved at the electrodes. At the time $t_1$ that the battery is fully charged, the control circuit 3 detects the maximum voltage level and controls the SCR to thereby prevent any charging current from being applied to the battery 1. The control circuit 3 by preventing any charging current from being applied to the battery 1, and by being energized by the battery during such period, causes the voltage of the battery to be immediately droped, hereinafter referred to as the "drop-back voltage", to a voltage level $V_2$. The control circuit detects the drop in voltage to the level $V_2$ at a time $t_2$, and in response thereto, controls the SCR 2 to permit a portion of the charging current $I_2$ produced by the power supply 4 to be applied to the battery 1 to thereby provide less charging current and thereby avoid accelerating the deterioration of the battery. It is noted that the voltage $V_1$ at which the first phase of charging is completed is predetermined to effect a substantially 100% charging of the secondary battery.

Figure 3:
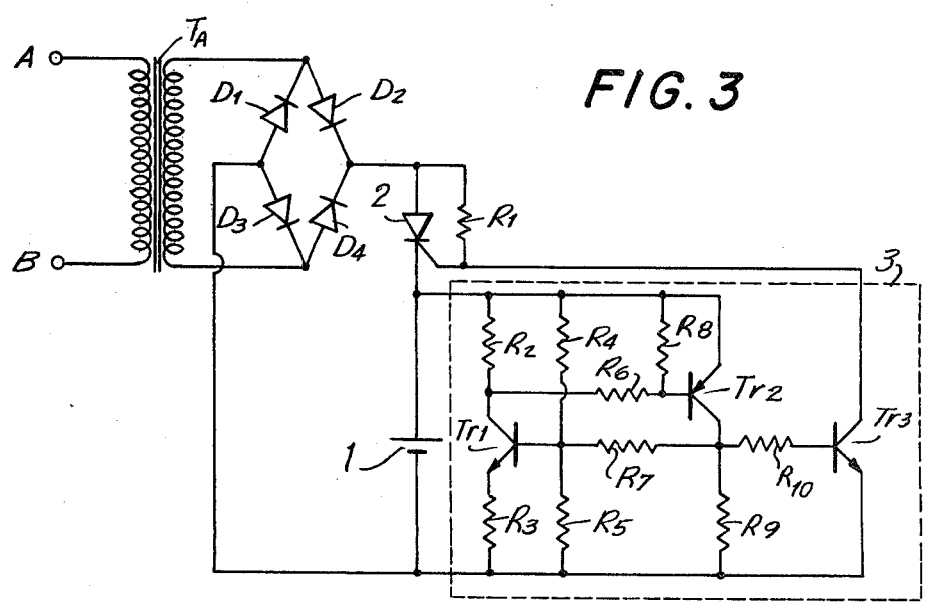
FIG. 3 is a detailed circuit diagram of the charging circuit depicted in FIG. 2.

Reference is now made to FIG. 3, wherein a detailed circuit diagram of the charging circuit depicted in FIG. 2 is illustrated, like reference numerals being utilized to denote like elements. The power supply include a transformer $T_A$ adapted to be utilized with a commercial AC power source represented by terminals A and B. The power supply further includes a full wave rectifier comprised of diodes $D_1$, $D_2$, and $D_4$, for converting the AC line voltage to a uni-directional driving current. The SCR 2 is coupled in series with a storage battery 1 to effect a gating of the charging current thereto in a manner to be described more fully below. A resistor $R_1$ is coupled between the gate electrode and anode electrode of the SCR to effect triggering of the gate.

Control circuit 3 includes first and second transistors $Tr_1$ and $Tr_2$, which transistors define a flip-flop circuit, and third transistor $Tr_3$, which transistor is controlled by transistors $Tr_1$ and $Tr_2$. Resistors $R_4$, $R_5$, $R_7$ and $R_9$ determine the voltage applied to the base electrode of the transistor $Tr_1$ and thereby control the operation thereof. Resistor $R_2$ is coupled to the collector electrode of transistor $Tr_1$ and to resistor $R_6$ and in combination with resistor $R_8$ and resistor $R_3$, which resistor is coupled to the emitter electrode of transistor $Tr_1$, to control the level of the voltage applied to the base electrode of the transistor $Tr_2$. The operation of the transistor $Tr_3$ is controlled by resistor $R_8$, which resistor is coupled to the collector of transistor $Tr_2$ and resistor $R_{10}$ to thereby control the gate electrode of the SCR 2 and effect a turning ON and turning OFF thereof.

The operation of circuit depicted in FIG. 3 is explained with reference to FIG. 1. During the first phase of charging, when the battery 1 is being fully charged to the voltage $V_1$, transistors $Tr_1$, $Tr_2$ and $Tr_3$ are either turned OFF or are substantially non-conductive. Accordingly, any of the charging current being applied to the trigger resistor $R_1$ forward biases the SCR in such manner as to turn same ON and thereby supply a maximum charging current $I_1$ to the storage battery 1. At the next phase of operation, when the battery is fully charged to a voltage level $V_1$ at a time $t_1$, the voltage level $V_1$ is sufficient to turn ON the transistors $Tr_1$, $Tr_2$ and $Tr_3$ forming the control circuit 3. By turning ON the transistors forming the control circuit 3, the collector-emitter parts thereof are rendered conductive, thereby permitting current to flow through resistor $R_1$ and effect a reverse bias or prevent a forward bias across the SCR gate and anode electrodes, to thereby turn same OFF. By turning OFF the SCR, the charging current produced by the power supply is prevented from being applied to the storage battery.

Once the charging current is no longer applied to the storage battery, the battery begins to apply current to the control circuit 3, thereby effecting the dropping back of the battery voltage to the level $V_2$. Accordingly, between the time $t_1$ and the time $t_2$, as is illustrated in FIG. 1, no charging current is applied to the battery, thereby accelerating the drop back voltage reaching the level $V_2$. Once the voltage of the storage battery reaches the level $V_2$, the transistor $Tr_2$ is turned OFF, thereby turning OFF the transistor $Tr_3$. Accordingly, the resistor $R_1$ is once again forwardly biased, thereby turning ON the SCR 2, to thereby apply charging current to the battery 1. Nevertheless, the transistor $Tr_1$ remains ON, thereby providing an additional current path for the charging current and hence reducing the charging current applied to the battery to $I_2$, to thereby charge the battery at a reduced current level $I_2$.

Accordingly, the charging circuit depicted in FIG. 3 is particularly characterized by providing three phases of charging. In the first phase, a maximum charging current $I_1$ is applied to rapidly charge the battery to a maximum voltage $V_1$. In a second phase, no current is applied to the charging battery, and the control circuit accelerates the drop back voltage. In a third phase, a reduced current $I_2$ is applied to the battery. By charging a battery in the aforedescribed three phase manner, the battery is initially substantially 100% charged, and thereafter, overcharging and hence deterioration of the battery life is avoided.

Figure 4:
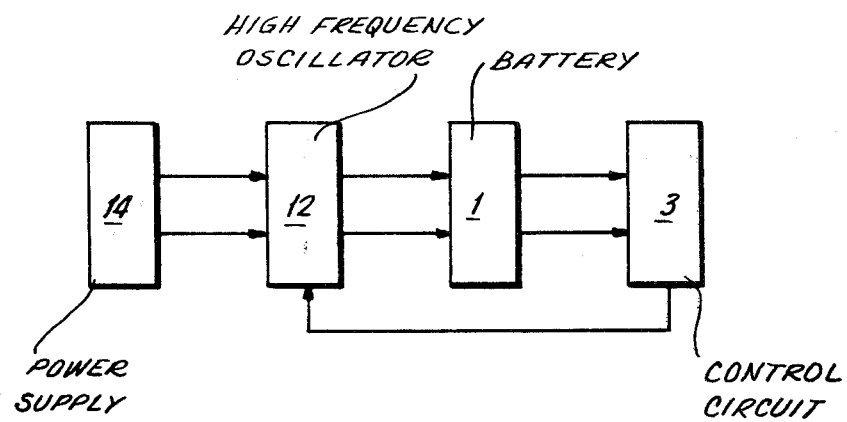
FIG. 4 is a block circuit diagram of a charging circuit constructed in accordance with a second embodiment of the instant invention.
Figure 5:
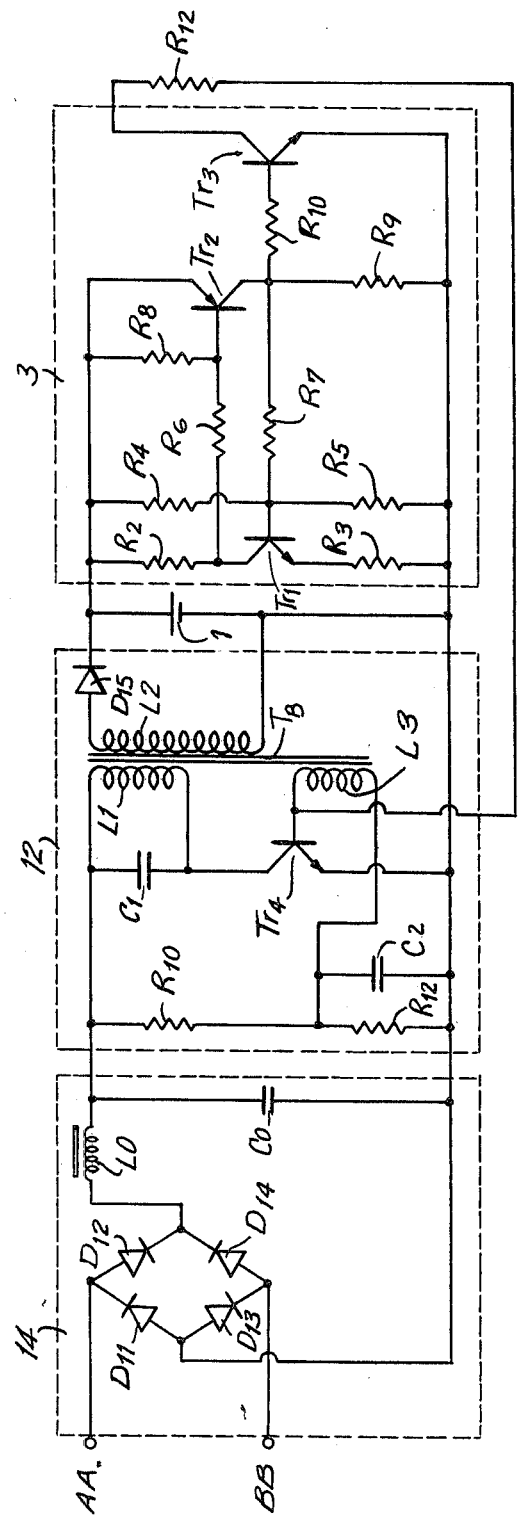
FIG. 5 is a detailed circuit diagram of the charging circuit depicted in FIG. 4.

Reference is now made to FIGS. 4 and 5, wherein a charging circuit constructed in accordance with the second embodiment of the instant invention is depicted, like reference numerals being utilized to denote like elements detailed above. A power supply 14 converts a commercial AC voltage to a DC charging voltage and applies same to a high frequency oscillator 12 to effect oscillation thereof. High frequency oscillator 12 is adapted to supply a charging current $I_1$ to the battery and is further adapted to be turned OFF by the control circuit 3 to thereby prevent current from being applied to the battery 1. As in the embodiment described above, the control circuit 3, in response to detecting the battery 1 being completely charged to a voltage level $V_1$, controls the high frequency oscillator 12 by turning same off, to thereby prevent charging of the battery 1 until the drop back voltage reaches a level $V_2$, whereafter a reduced current $I_2$ is applied to the battery 1.

The power supply 14 is comprised of a full wave rectifier bridge including diodes $D_{11}$, $D_{12}$, $D_{13}$ and $D_{14}$, coupled to commercial AC line supply terminals AA and BB for converting the AC line supply voltage to a DC voltage. A noise absorption and smoothing circuit including inductor $L_O$ and capacitor $C_O$ smooth out the DC signal to be applied to the high frequency oscillator circuit 12.

High frequency oscillator 12 is a blocking oscillator including resistors $R_{11}$ and $R_{12}$, which resistors are coupled to the base electrode of transistor $Tr_4$ for controlling the operation of same. A transformer $T_B$ includes a first primary coil $L_1$ having a capacitor $C_1$ coupled thereacross to define an LC tank circuit adapted to be oscillated in response to the transistor by bening turned ON. Transformer $T_B$ also includes a second primary transformer coil $L_3$ coupled to the base electrode of the transistor $Tr_4$ and capacitor $C_2$. Coil $L_3$ and capacitor $C_2$ define a second tank circuit for controlling the base electrode of transistor $Tr_4$. A secondary coil $L_2$ is coupled through a rectifying diode $D_{15}$ to the battery 1. The second primary coil $L_3$ further defines a feedback coil and is coupled to the control circuit 3 through resistor $R_{12}$.

Accordingly, when a commercial line supply voltage is applied to the input terminals AA and BB of the power supply 14, a DC voltage is applied to the high frequency oscillator circuit 12. As is illustrated in FIG. 1, during the first phase of charging, when the battery 1 is charged to a complete charge level $V_1$, as in the embodiment depicted above, the transistors $Tr_1$, $Tr_2$ and $Tr_3$ forming the control circuit 3 are OFF or negligibly conductive. Moreover, the current applied to the voltage divider circuit comprised of resistors $R_{11}$ and $R_{12}$ controls the transistor $Tr_4$ to oscillate the high frequency oscillator circuit and to thereby apply a charging current through rectifying diode $D_{15}$ to storage battery 1. Once the battery is fully charged to the voltage level $V_1$, as in the manner described above, all of the transistors in the control circuit 3 are turned ON. By turning the transistor $Tr_3$ ON, the base electrode of the transistor $Tr_4$ is reverse biased, thereby turning transistors $Tr$ OFF and preventing the oscillator circuit 12 from oscillating. Once the oscillator circuit 12 is turned OFF, no charging current is produced thereby, and accordingly, no charging current is applied to the battery 1. Accordingly, from the time $t_1$ to the time $t_2$ that the drop back voltage of battery drops to the level $V_2$, no charging current is applied to the battery 1, and the control circuit 3 receives current from the battery 1, thereby accelerating the drop in the drop back voltage to the voltage level $V_2$. At the time $t_2$ that the control circuit 3 detects the voltage level $V_2$ of the battery 1, the transistors $Tr_2$ and $Tr_3$ of the control circuit 3 are turned OFF, thereby permitting the base electrode of the transistor $Tr_4$ to once again forwardly bias transistor $Tr_4$ to once again produce a charging current. Accordingly, the oscillator circuit 12 begins to oscillate and supplies a reduced charging current $I_2$ to the battery 1. The remaining charging current produced by the oscillator circuit 12 is applied through the collector-emitter current path defined by the transistor $Tr_1$, which transistor remains ON at the time $t_2$ that the voltage level $V_2$ is detected by the control circuit 3.

Figure 6:
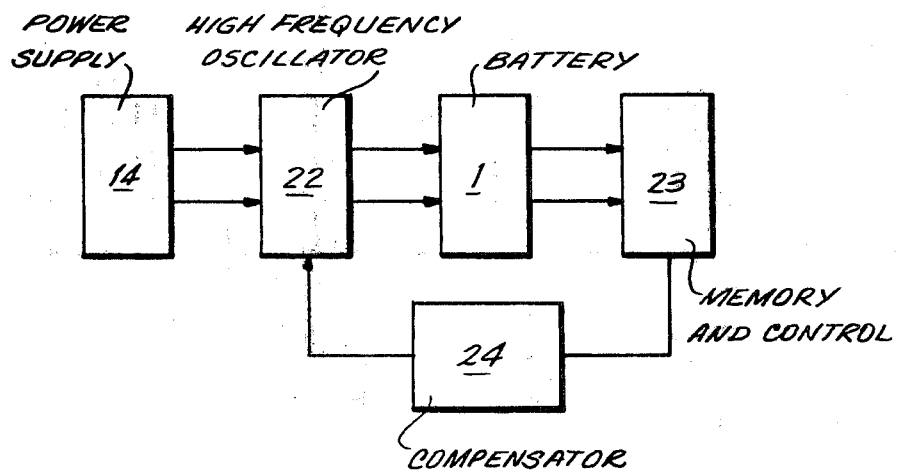
FIG. 6 is a block circuit diagram of a charging circuit constructed in accordance with a third embodiment of the instant invention.
Figure 7:
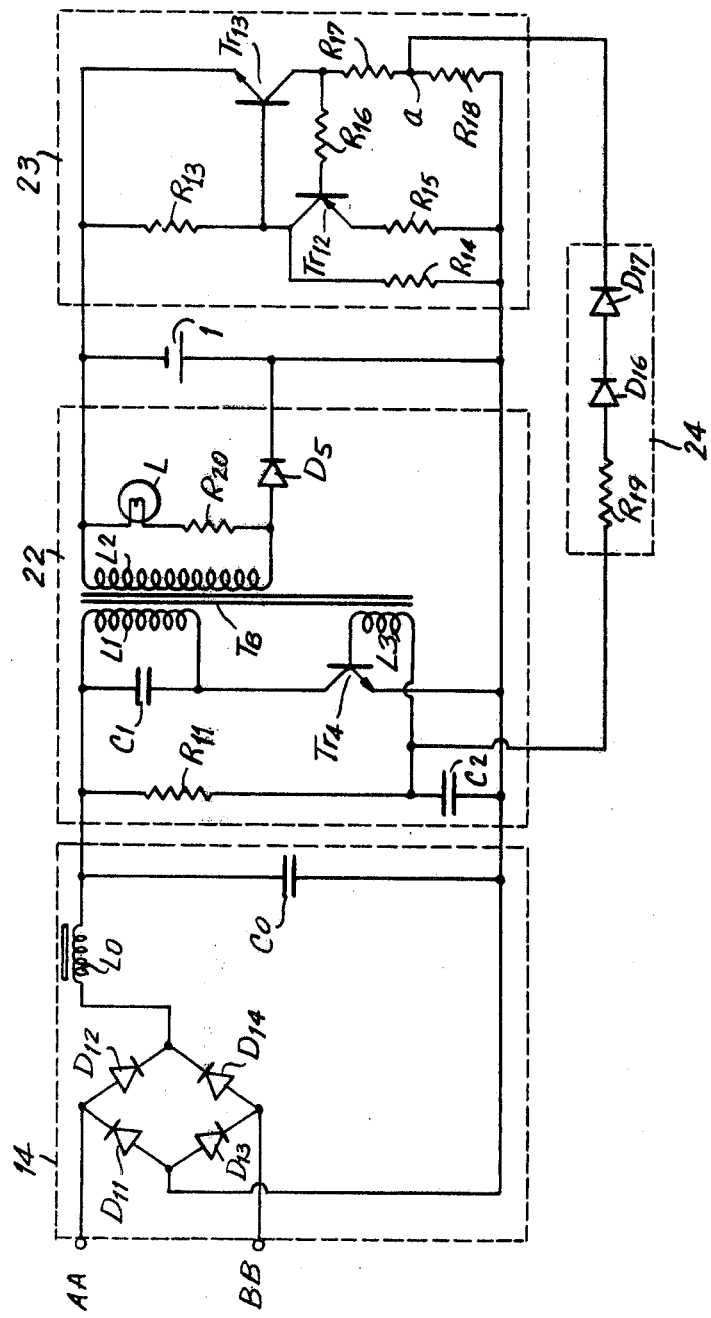
FIG. 7 is a detailed circuit diagram of the charging circuit depicted in FIG. 6.

Reference is now made to FIGS. 6 and 7, wherein still a further charging circuit constructed in accordance with the instant invention is depicted, like reference numerals being utilized to denote like element described above. A memory and control circuit 23 is provided to detect the voltage level of the battery 1, and additionally memorizes the potential thereof to further control a high frequency oscillator circuit 22. The high frequency oscillator circuit 22 is driven by power supply 14 and is coupled to the memory and control circuit 23 through a revirse bias compensator circuit 24 to effect the same three phase charging of the battery 1 illustrated in FIG. 1.

The oscillator circuit 22 is similar to the oscillator circuit 12 depicted in FIG. 5. However, the resistor $R_{11}$ is coupled through a primary transformer coil $L_2$ of transformer $T_B$ to effect a forward biasing of the transistor $Tr_4$. Additionally, the resistor $R_{11}$ and primary transformer coil $L_3$ are coupled through a capacitor $C_2$ to a reference terminal. The primary transformer coil $L_1$ of the transformer $T_B$ is coupled in parallel with a capacitor $C_1$. The secondary transformer coil $L_2$ of the transformer $T_B$ is coupled through a rectifying diode $D_5$ to the battery 1. The capacitor $C_1$ and coil $L_1$ form a first tank circuit and the capacitor $C_2$ and coil $L_3$ form a second tank circuit. Additionally, a indicator lamp L is coupld across the secondary transformer coil $L_2$ to detect when the charging circuit is being applied to the secondary battery 1. A resistor $R_{20}$ is coupled in series with the indicator lamp L to limit current applied thereto.

The control and memory circuit 23 includes first and second transistors $Tr_{12}$ and $Tr_{13}$, defining a flip-flop circuit including resistors $R_{13}$ through $R_{18}$. As illustrated in FIG. 1, and discussed with respect to the earlier embodiments, the transistors $Tr_{12}$ and $Tr_{13}$ are turned OFF during the first phase of charging, and the oscillator circuit thereby applies a charging current $I_1$ to the battery 1. At a time $t_1$ that the battery is completely charged to a voltage level $V_1$, the control circuit 23 detects the voltage level $V_1$ and transistors $Tr_{12}$ and $Tr_{13}$ are turned ON. Accordingly, current is conducted through the emitter-collector path of the transistor $Tr_{13}$ and a control potential $V_a$ is applied at the junction a. The potential $V_a$ at the junction a is represented by the following:

$$V_a R_{18} \times I_C$$

wherein $I_C$ is the collector current of the transistor $Tr_{13}$. Accordingly, the potential $V_a$ is negative with respect to the reference terminal and thereby references the base electrode of the transistor $Tr_4$ to a negative potential. By referencing the base electrode of the transistor $Tr_4$ to a negative potential, oscillation of a high frequency oscillator circuit 22 is prevented, thereby preventing any charge current from being applied to the battery. Additionally, the current dissipated by the control circuit 23 accelerates the drop back voltage of the battery from the maximum voltage $V_1$ to the voltage level $V_2$. Accordingly, until the voltage of the battery is dropped back to level $V_2$, no current or substantially no current is applied to the battery.

At the time $t_2$ that the voltage level of the battery is $V_2$, the transistor $Tr_{13}$ is turned OFF, thereby once again positively referencing the base electrode of the transistor $Tr_4$ through compensator circuit 24 including resistor $R_{19}$ and diodes $D_{16}$ and $D_{17}$, to thereby permit the oscillator circuit 22 to once again begin oscillating and charging the battery 1. It is noted that the transistor $Tr_{12}$ remains ON and thereby diverts a portion of the charging current to reduce the charging current applied to the battery to a lower level $I_2$.

The reverse bias compensator circuit 4 is utilized in view of the negative potential of the junction a when the transistor $Tr_{13}$ is turned ON. Specifically, if the junction a were coupled directly to the base electrode of the transistor $Tr_4$, it would be difficult, if not impossible, to forward bias the transistor $Tr_4$ when the voltage level of the battery were dropped back to the voltage level $V_2$, and would therefore prevent the charging current from being supplied to the battery at the time $t_2$. Accordingly, the reverse bias compensator references the base electrode of transistor $Tr_4$ to a voltage level a little less than or equal to the reverse bias voltage thereof.

It is further noted that the charge circuit depicted in FIG. 7 can be rendered independent of temperature characteristics by connecting a thermistor or othe temperature compensation device having a negative resistance temperature coefficient to the resistor $R_{14}$. By utilizing such a thermistor, a maximum charge level can be selectively within a range 0° C. to 45° C., to thereby obtain substantially 100% charging of the battery.

Finally, as noted herein, the term battery refers to a single DC cell or a plurality of series-coupled DC cells forming a storage battery.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A charging circuit for charging a DC cell, comprising in combination supply means for producing a current, current gaing means disposed intermediate said DC cell and said supply means for selectively supplying a charging current of a first selected value to said DC cell in response to said current produced by said supply means, and control means coupled to said DC cell and to said gating means, said control means being adapted to detect when said cell is charged to a predetermined maximum voltage, and in response thereto, control said gating means to prevent said charging current from being supplied to said DC cell, said control means in response to a drop in the voltage of said cell to a second predetermined level defining a first closed current path means in parallel with said DC cell and controlling said gating means to permit said charging current to be applied to said DC cell and to said first closed current path means so that a charging current of a second value reduced with respect to said first value is supplied to said DC cell.

2. A charging circuit as claimed in claim 1, wherein said control means is coupled to said DC cell and is adapted to be energized thereby when said gating means prevents said charging current from being supplied to said DC cell, to thereby accelerate the drop in the voltage of said DC cell from said predetermined maximum voltage to said second predetermined voltage level.

3. A charging circuit as claimed in claim 2, wherein said first current path means defines an open circuit in response to said DC cell being charged to said predetermined maximum potential 4. A charging circuit as claimed in claim 3, wherein said control circuit includes second current path means coupled to said first current path means, said second current path means being coupled to said gating means to define a closed current path when said control means detects said DC cell being charged to said predetermined maximum voltage, said closed current path controlling said gating means to prevent said charging current from being supplied to said DC cell.

5. A charging circuit as claimed in claim 4, wherein said gating means includes control electrode means coupled to said second current path means.

6. A charging circuit as claimed in claim 5, wherein said gating circuit means is an SCR including a gate electrode, said gate electrode defining said control electrode coupled to said second current path means.

7. A gating circuit as claimed in claim 5, wherein said gating circuit means is a high frequency oscillator circuit means, said high frequency oscillator circuit means including control transistor means having a base electrode, said base electrode defining said control electrode and being coupled to said second current path means for effecting oscillation of said oscillator circuit means, said control transistor mans being turned OFF in response to said second current path means defining a closed current path, said oscillator circuit means further including rectifying means for supplying said charging current produced by said oscillator circuit to said DC cell.

8. A charging circuit is claimed in claim 7, wherein said high frequency oscillator circuit means includes LC tank circuit means coupled to said control transistor means for producing a high frequency signal, and transformer means for applying said high frequency signal to said rectifying means to produce said charging current of said first selected value.

9. A charging circuit is claimed in claim 2, wherein said control means includes first and second transistor means forming a flip-flop control circuit, said first and second transistor means being coupled in parallel with said DC cell, said first and second transistor means being adapted to be turned OFF when said DC cell is being charged to said predetermined maximum voltage, both said transistor means being adapted to be turned ON in response to said DC cell being charged to said predetermined maximum voltage, said first transistor means remaining ON to thereby define a closed current path in response to the voltage of said DC cell dropping to said second predetermined level, said second transistor means being turned OFF to thereby define open current path in response to the voltage of said DC cell dropping to said second predetermined level.

10. The charging circuit is claimed in claim 9, wherein said gating means includes a control electrode coupled to said second transistor means, said control electrode being adapted to turn OFF said gating means in response to said second transistor meand defining a closed current path, to thereby prevent charging current from being supplied to said DC cell.

11. A charging circuit as claimed in claim 10, wherein said gating means includes an SCR having a gate electrode defining said control electrode.

12. A charging circuit as claimed in claim 10, wherein said gating circuit is a high frequency oscillating circuit, said high frequency oscillating circit including a LC tank circuit, a control transistor for controling the oscillation of said tank circuit, said transistor including said control electrode coupled to said second transistor means, said oscillator circuit means further including rectifying means for supplying said charging current produced by said LC tank circuit means to said DC cell.

13. A charging circuit as claimed in claim 12, wherein said oscillating circuit control transistor is coupled to said second transistor means and is negatively referenced with respect to ground in response to said second transistor means defining a closed current path, and a reverse bias compensator means disposed intermediate said second transistor means and said control electrode to negatively reference said control electrode to a voltage level equal to to less than the voltage level for reverse biasing said control transistor to thereby turn same OFF when said second transistor means defines said closed current path.

14. A charging circuit as claimed in claim 12, and including indicator means coupled in parallel with said DC cell for indicating when said DC cell is being charged.

* * * * *